T. B. & J. STOUT.
Coffee Pot.
No. 91,787. Patented June 22, 1869.
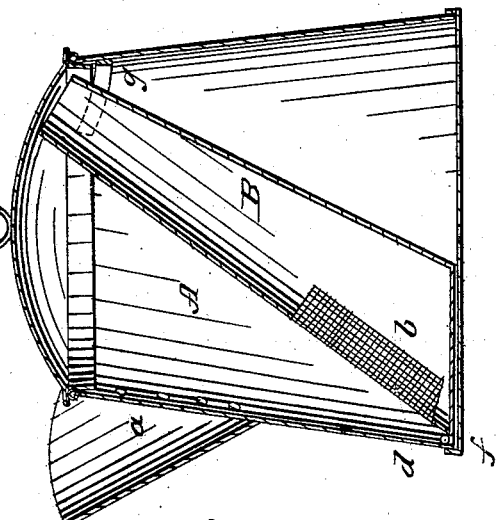
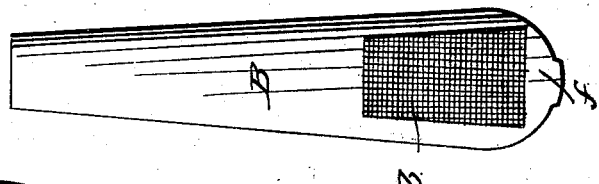
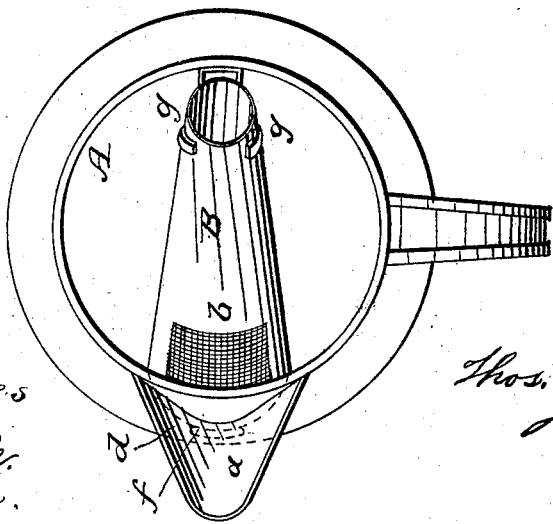

United States Patent Office.

THOMAS B. STOUT AND JOSEPH STOUT, OF KEYPORT, NEW JERSEY.

Letters Patent No. 91,787, dated June 22, 1869.

COFFEE AND TEAPOT.

The Schedule referred to in these Letters Patent and making part of the same.

*To all whom it may concern:*

Be it known that we, THOMAS B. STOUT and JOSEPH STOUT, of Keyport, in the county of Monmouth, and State of New Jersey, have invented an Improved Coffee and Teapot; and we do hereby declare that the following is a full and exact description thereof, reference being had to the accompanying drawings, making part of this specification—

Figure 1 being a top view of a coffee-pot (without the cover) provided with our improvement.

Figure 2, a central vertical section thereof, cutting in a plane through the spout.

Figure 3, a front view of the receptacle.

Like letters designate corresponding parts in all of the figures.

Our invention consists in the employment, within the pot, of a receptacle to hold the coffee or tea, substantially as herein specified, its interior communicating with the interior of the pot through a wire, or perforated metal strainer.

We make the receptacle B, for holding the coffee or tea, of any suitable shape or size, extending from the bottom toward, or to the top of the pot A.

It has a strainer, $b$, on one side, near the bottom, as shown, or at a suitable distance from the top, or on the bottom itself, for straining the decoction as it passes from the receptacle into the pot, from the dregs, which are retained within the receptacle.

The receptacle may be placed at or secured to the side, or on the bottom of the pot, and extend up any suitable distance, either as high as the top of the pot, in which case it may be open at the upper end, or only part way to the top, in which case it should have a cover itself; or it may extend up through the cover of the pot, and have a cover above that. In the latter case, it may be fastened to the cover, instead of the body of the pot.

This construction, however, would require the pot to be turned upside down, for discharging the dregs, and hence would not be so convenient in use.

For several reasons, the following construction is most desirable:

First, the receptacle is situated obliquely from the front of the pot at the bottom, or under the spout $a$, to the opposite side of the pot at the top, reaching about as high as the same, as shown.

The object of this arrangement is twofold: one, when pouring out the coffee or tea, the dregs will settle to the bottom of the receptacle, instead of running out at the top and mixing with the beverage, as might be the case if the receptacle were placed upright; the other, that by turning the pot in the opposite direction from the spout, the dregs can be readily thrown out of the receptacle.

Second, we secure the receptacle in the pot, so that it will be fast when in place, but can be very readily removed and reinserted.

Our device for effecting this consists in forming a projection, or hook, $f$, at the lower front end of the receptacle, to fit under a loop or projection, $d$, in the pot, in the proper position, as shown.

At the top, the receptacle slips between two spring-fingers $g\ g$, which hold it with sufficient force to keep it in place, but so as to allow it to be removed by exerting a little force with the hand.

The lower end is readily inserted under the loop $d$, or withdrawn therefrom. Thus, the receptacle can be quickly removed for cleaning.

The spring-fingers need not clasp the receptacle, but only a projection therefrom.

Among the advantages of this receptacle are, first, its convenience in use, more so than the coffee-pot without it, the coffee being easily put therein, and the dregs removed therefrom; second, the coffee or tea, when poured out, is always free from dregs, they being confined in the receptacle, and not being allowed to boil over; third, the coffee or tea may be boiled, or not, as desired. For boiling, the strainer and bottom of the receptacle may be arranged as represented, the bottom resting on the bottom of the teapot. For steeping, the strainer and bottom of the receptacle may be placed at any suitable height from the bottom of the pot. This receptacle-bottom and strainer may be one, and the sides of the receptacle may extend below it, being open at the lower end.

What we claim as our invention, and desire to secure by Letters Patent, is—

The oblique receptacle B, arranged in the pot A, in relation to its spout, and secured therein, substantially as and for the purposes herein specified.

THOS. B. STOUT.
JOSEPH STOUT.

Witnesses:
MARCUS B. TAYLOR,
EUGENIA S. TAYLOR.